US012216308B1

(12) United States Patent
Liu (10) Patent No.: US 12,216,308 B1
(45) Date of Patent: Feb. 4, 2025

(54) LUMINOUS KEYBOARD WITH SUSPENDED VISUAL EFFECT

(71) Applicant: AMERICAN FUTURE TECHNOLOGY, City of Industry, CA (US)

(72) Inventor: You-Chi Liu, City of Industry, CA (US)

(73) Assignee: AMERICAN FUTURE TECHNOLOGY, City Of Industry, CA (US)

( * ) Notice: Subject to any disclaimer, the term of this patent is extended or adjusted under 35 U.S.C. 154(b) by 0 days.

(21) Appl. No.: 18/737,753

(22) Filed: Jun. 7, 2024

(30) Foreign Application Priority Data

Aug. 2, 2023 (TW) ................................. 112129122

(51) Int. Cl.
*F21V 8/00* (2006.01)
*G06F 3/02* (2006.01)

(52) U.S. Cl.
CPC ......... *G02B 6/0088* (2013.01); *G06F 3/0202* (2013.01)

(58) Field of Classification Search
CPC .... G02B 6/0088; G06F 3/0202; H01H 13/70; H03K 17/9638
See application file for complete search history.

(56) References Cited

FOREIGN PATENT DOCUMENTS

| CN | 114496627 A * | 5/2022 | ............... G06F 3/02 |
| WO | WO-0120628 A1 * | 3/2001 | ........... G06F 3/0202 |
| WO | WO-2010090877 A1 * | 8/2010 | ........... G02B 26/001 |

OTHER PUBLICATIONS

Innovation Q+ NPL Search (Year: 2024).*

* cited by examiner

*Primary Examiner* — Anabel Ton
(74) *Attorney, Agent, or Firm* — MUNCY, GEISSLER, OLDS & LOWE, P.C.

(57) ABSTRACT

A luminous keyboard includes a light guide holder base including a light-transmitting base seat, a light guide seat with a light guide plate and a circuit board mounted in the light guide plate and provided with a plurality of light-emitting elements surrounding the periphery and a processor electrically connected to a computer host, a keyboard assembly located on the light guide seat, and a light guide shell covers the light guide holder base and providing an accommodating opening for exposing the key module of the keyboard assembly. The light guide seat of the light guide holder base is positioned on protruding fixing portions of the bottom panel of the base seat, so that the light guide seat is a distance away from the bottom panel, thereby making the light-emitting lights on the light guide seat are in a light-emitting state suspended on the bottom panel.

5 Claims, 7 Drawing Sheets

LUMINOUS KEYBOARD WITH SUSPENDED VISUAL EFFECT

This application claims the priority benefit of Taiwan patent application number 112129122, filed on Aug. 2, 2023.

BACKGROUND OF THE INVENTION

1. Field of the Invention

The present invention relates to a luminous keyboard with suspended visual effect, and in particular to a base seat made of light-transmitting material with a plurality of fixing portions protruding inside, and a light guide seat positioned on the fixing portions and kept at a distance away from the bottom panel of the base seat, so that a plurality of light-emitting elements arranged around the periphery of the surface of the circuit board of the light guide seat project light to the light guide seat, forming a suspended visual luminous effect on the surface of the base seat.

2. Description of the Related Art

With the booming development of technology today, many emerging industries have gradually been integrated into the society with the development of technology. Among them, the emergence of games and related industries has further promoted the improvement of related technology products. The specifications and innovations of related products such as mice, mouse pads, keyboards, and host cases are also emerging one after another. In order to enhance the uniqueness of users, major manufacturers have added various styles of lighting methods for users to choose from.

Among them, keyboards are indispensable items for most industries that use computers. In order to increase the sales of keyboards, major manufacturers are also developing endless designs on keyboards. Luminous keyboards are developed for this purpose. However, most luminous keyboards only display light through the sides or keys, and lack novel lighting methods and effective lighting control methods. As a result, buyers will lose the sense of novelty soon after using them. This is the key point that those engaged in this industry urgently want to study and improve.

SUMMARY OF THE INVENTION

The main object of the present invention is that the luminous keyboard with suspended visual effect comprises a light guide holder base, a keyboard assembly, and a light guide shell. The light guide holder base comprises a base seat made of light-transmitting material and a light guide seat. The base seat comprises a bottom panel, a peripheral wall extending curvedly around the periphery of the bottom panel, a positioning portion provided on the top surface of the bottom panel and a plurality of fixing portions protruded from the top surface of the bottom panel. The light guide seat is mounted on the fixing portions in the base seat and is a distance away from the bottom panel. The light guide seat comprises a light guide plate, a light guide peripheral wall extending curvedly around the periphery of the light guide plate corresponding to the peripheral wall of the light guide holder base, a positioning hole located on the light guide plate corresponding to the positioning portion, a circuit board provided in the positioning hole, a plurality of light-emitting elements provided around the periphery of the surface of the circuit board, and a processor provided on the surface of the circuit board. The keyboard assembly is located on the top surface of the light guide seat. The keyboard assembly comprises a key module. The light guide shell covers the light guide holder base. The light guide shell comprises an accommodating opening for exposing the key module of the keyboard assembly. The light guide seat of the light guide holder base is positioned on the fixing portions, so that the light guide seat is a distance away from the bottom panel, thereby forming a suspended visual luminous effect on the surface of the base seat made of light-transmitting material.

Another object of the present invention is that the luminous keyboard with suspended visual effect comprises a light guide holder base, a keyboard assembly, a light guide shell, and a computer host. The light guide holder base comprises a base seat made of light-transmitting material and a light guide seat. The base seat comprises a bottom panel, a peripheral wall extending curvedly around the periphery of the bottom panel, a positioning portion provided on the top surface of the bottom panel and a plurality of fixing portions protruded from the top surface of the bottom panel. The light guide seat is mounted on the fixing portions in the base seat and is a distance away from the bottom panel. The light guide seat comprises a light guide plate, a light guide peripheral wall extending curvedly around the periphery of the light guide plate corresponding to the peripheral wall of the light guide holder base, a positioning hole located on the light guide plate corresponding to the positioning portion, a circuit board provided in the positioning hole, a plurality of light-emitting elements provided around the periphery of the surface of the circuit board, and a processor provided on the surface of the circuit board and electrically connected to the computer host. The keyboard assembly is located on the top surface of the light guide seat. The keyboard assembly comprises a key module. The light guide shell covers the light guide holder base. The light guide shell comprises an accommodating opening for exposing the key module of the keyboard assembly. The processor controls the light-emitting elements surrounding the circuit board to display separately or operate synchronously. The computer host transmits signals to the light-emitting elements, so that the light-emitting elements display at least one or more color changes sequentially or synchronously according to the signals transmitted by the computer host to achieve the purpose of controlling the light-emitting mode.

DETAILED DESCRIPTION OF THE PREFERRED EMBODIMENT

Please refer to FIGS. 1 to 7. It can be clearly seen from the figures that the present invention mainly comprises a light guide holder base 1, a keyboard assembly 2 and a light guide shell 3. The connection relationship of the aforementioned components is as follows:

The light guide holder base 1 comprises a base seat 11 made of light-transmitting material and a light guide seat 12. The base seat 11 comprises a bottom panel 111, a peripheral wall 112 curved and extended into a bowl shape around the periphery of the bottom panel 111, a positioning portion 113 provided on the top surface of the bottom panel 111 and a plurality of fixing portions 114 protruded from the top surface of the bottom panel 111, and a plurality of feet 115 provided on the bottom surface thereof for the base seat 11 to be placed stably on a flat surface.

The light guide seat 12 is mounted on the fixing portions 114 in the base seat 11. The light guide seat 12 comprises a light guide plate 121, a light guide peripheral wall 122 curved and extended into a bowl shape around the periphery of the light guide plate 121 corresponding to the bowl-shaped peripheral wall 112 of the base seat 11, a positioning hole 1210 located on the light guide plate 121 corresponding to the positioning portion 113, a circuit board 123 positioned on the top surface of the positioning portion 113 in the positioning hole 1210, a plurality of light-emitting elements 1231 (such as LEDs) provided around the periphery of the surface of the circuit board 123, a processor 1232 provided on the surface of the circuit board 123 and a plurality of fixing holes 124 provided in the light guide seat 12 corresponding to the fixing portions 114.

The keyboard assembly 2 is mounted on the top surface of the light guide seat 12. The keyboard assembly 2 comprises a key module 21, an outer frame 211 arranged around the periphery of the key module 21, and a cushion pad 22 made of silicone material and provided on the bottom surface of the key module 21 to increase the pressing feel and buffer the pressing force.

Figure 1:
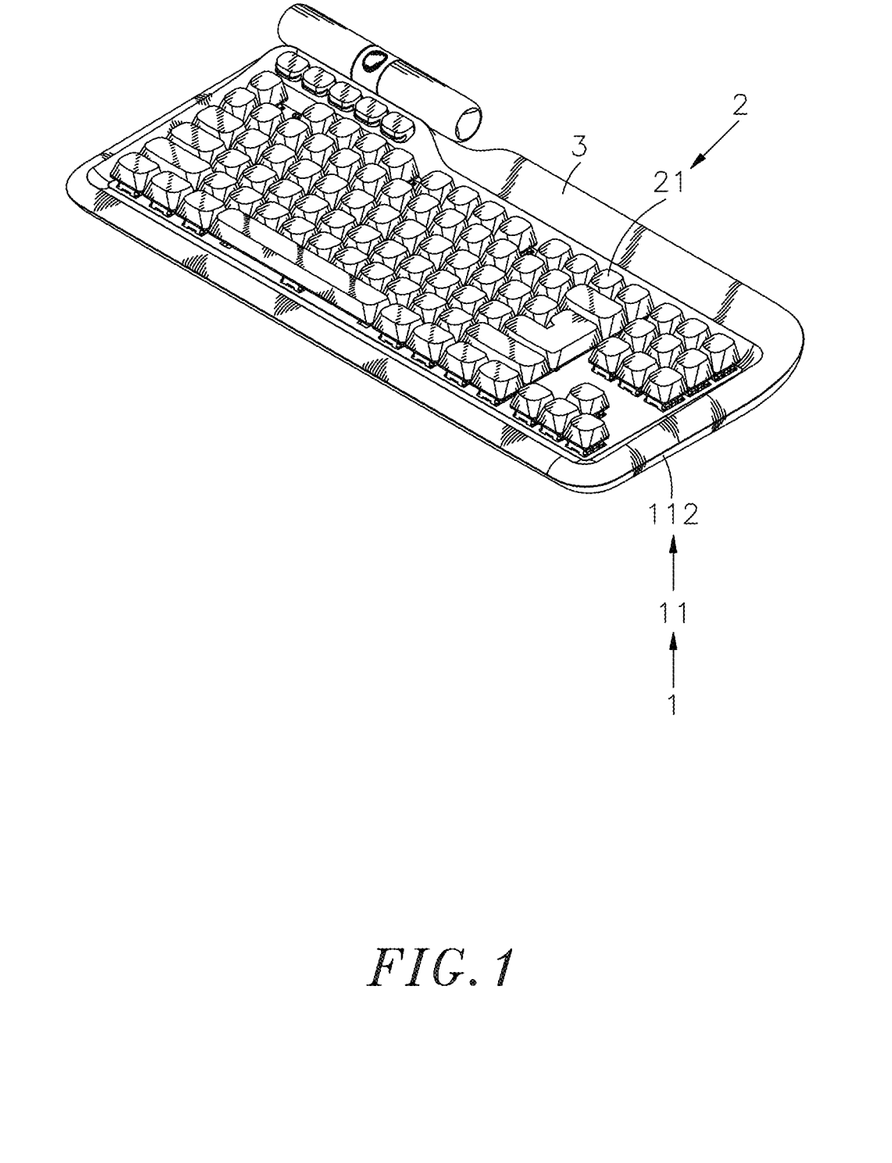
FIG. 1 is a three-dimensional appearance view of the present invention.
Figure 2:
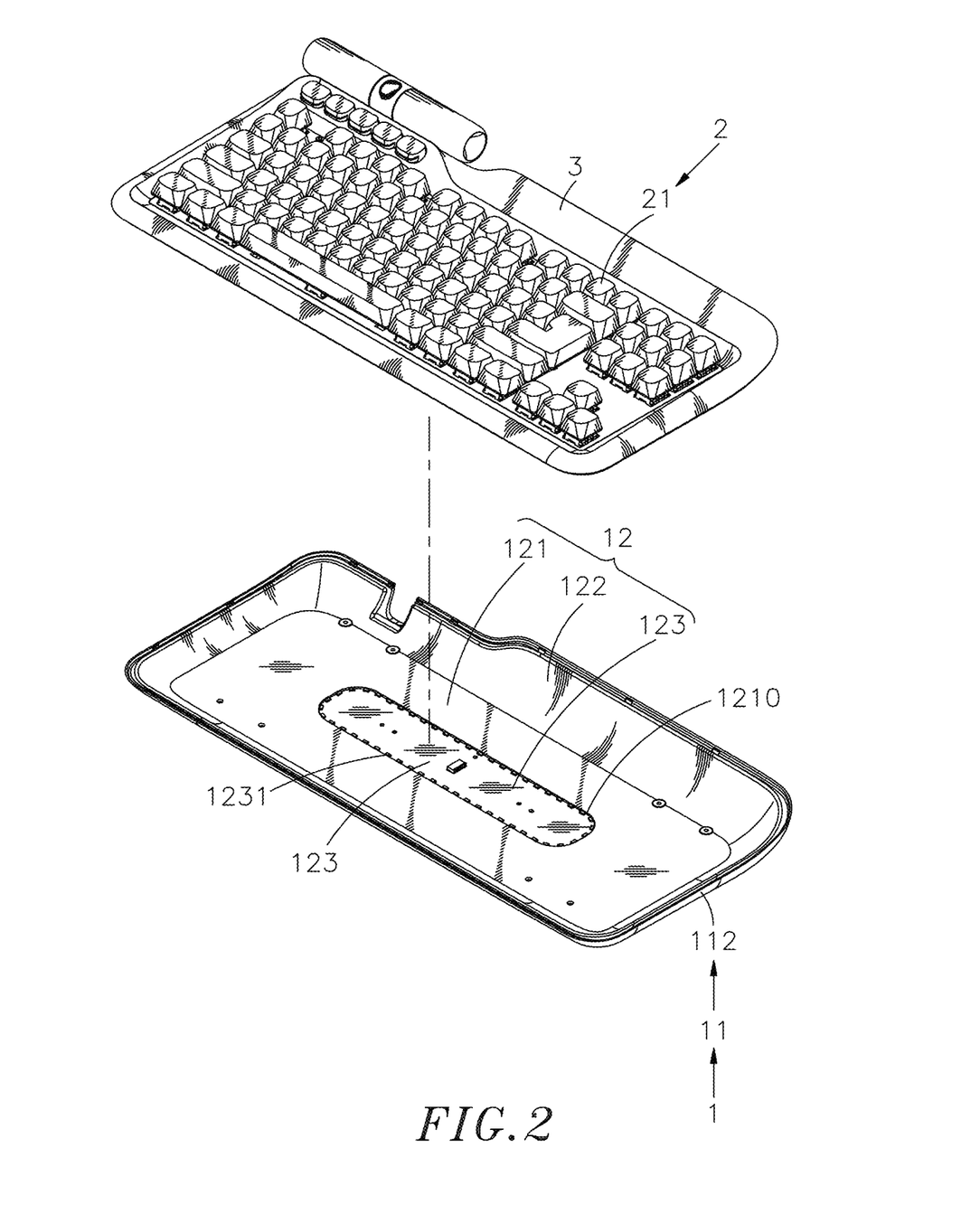
FIG. 2 is a three-dimensional exploded schematic diagram of the light guide holder base and keyboard assembly of the present invention.
Figure 3:
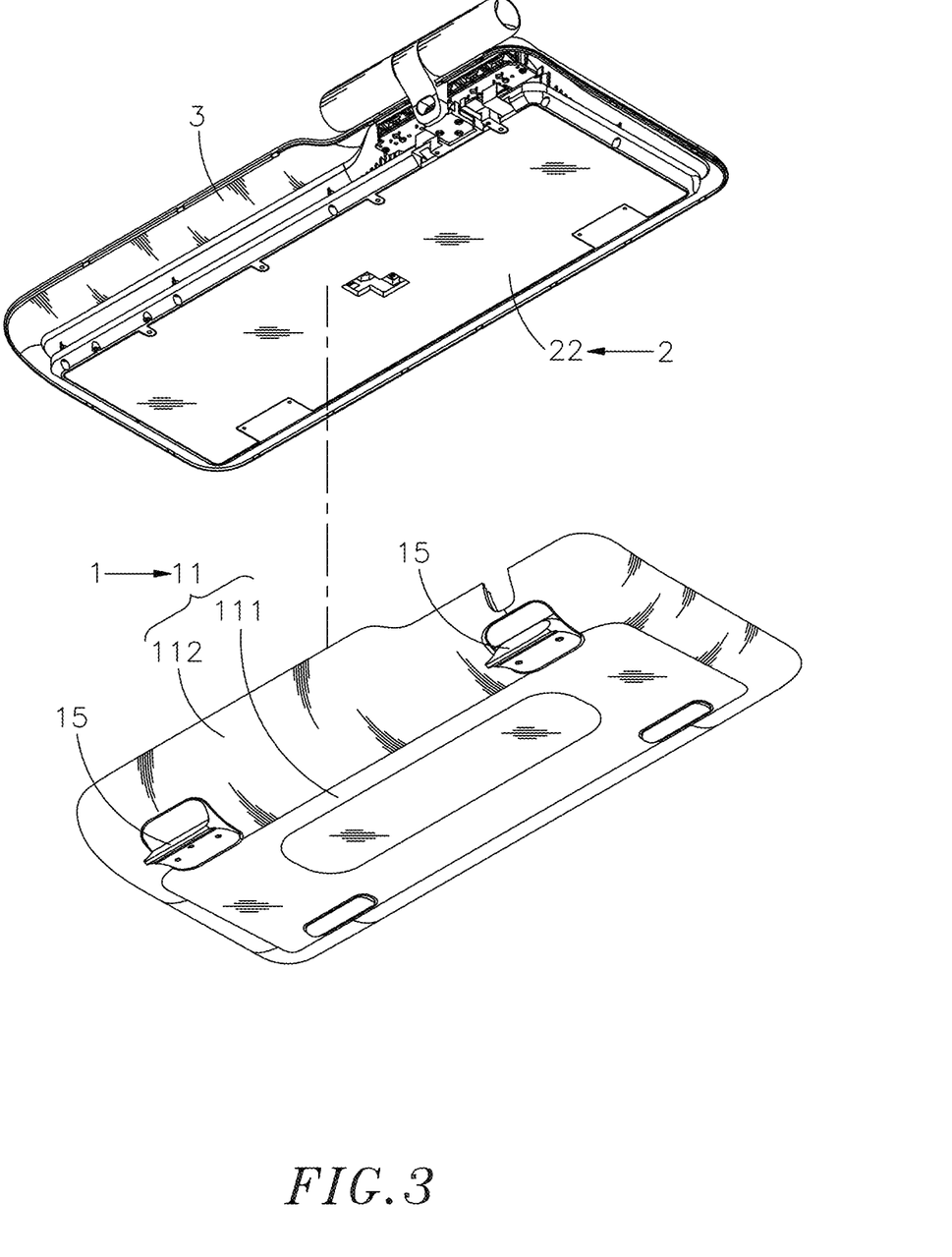
FIG. 3 is a three-dimensional exploded schematic diagram of the light guide holder base and keyboard assembly of the present invention from another perspective.
Figure 4:
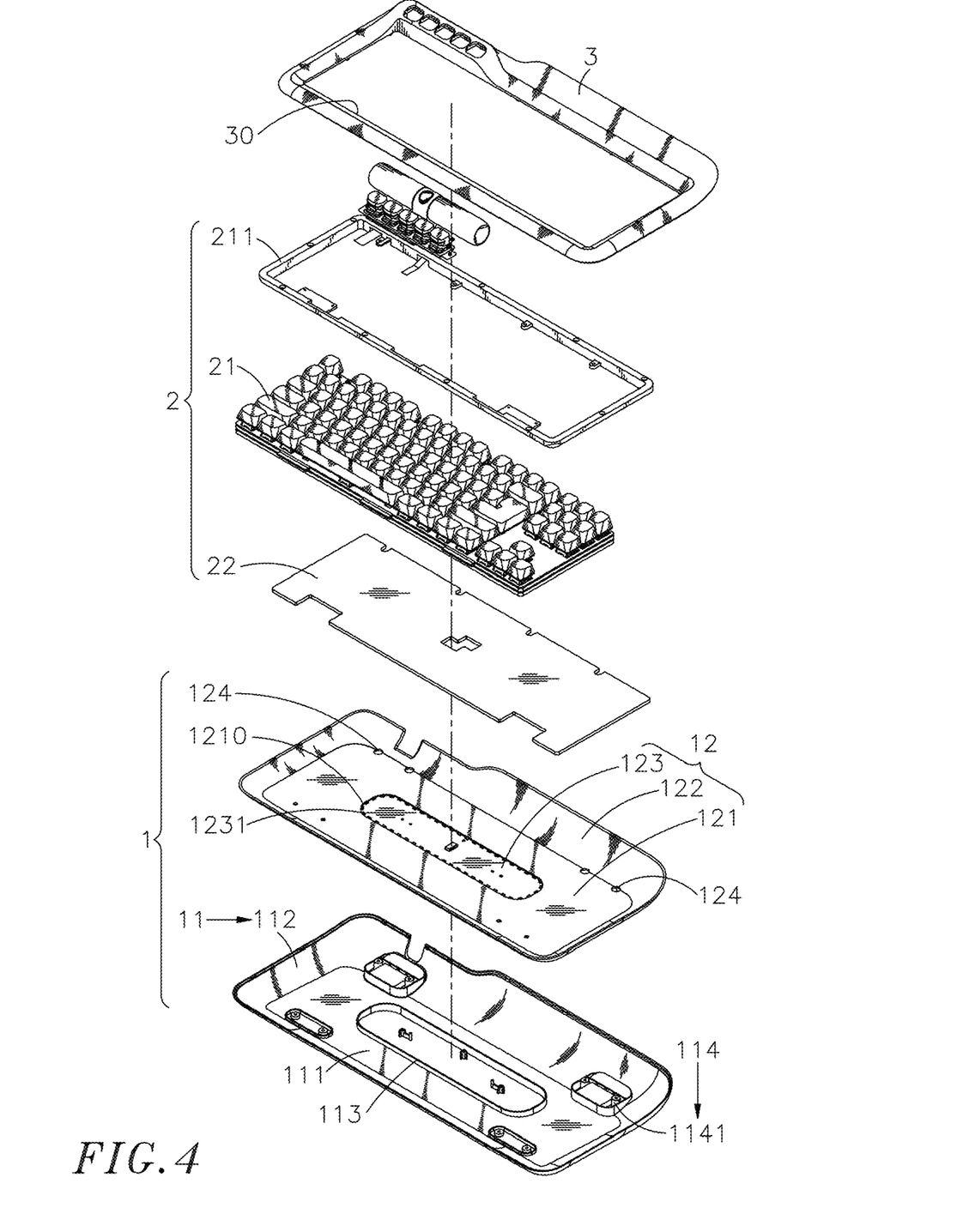
FIG. 4 is a three-dimensional exploded view of the present invention.
Figure 5:
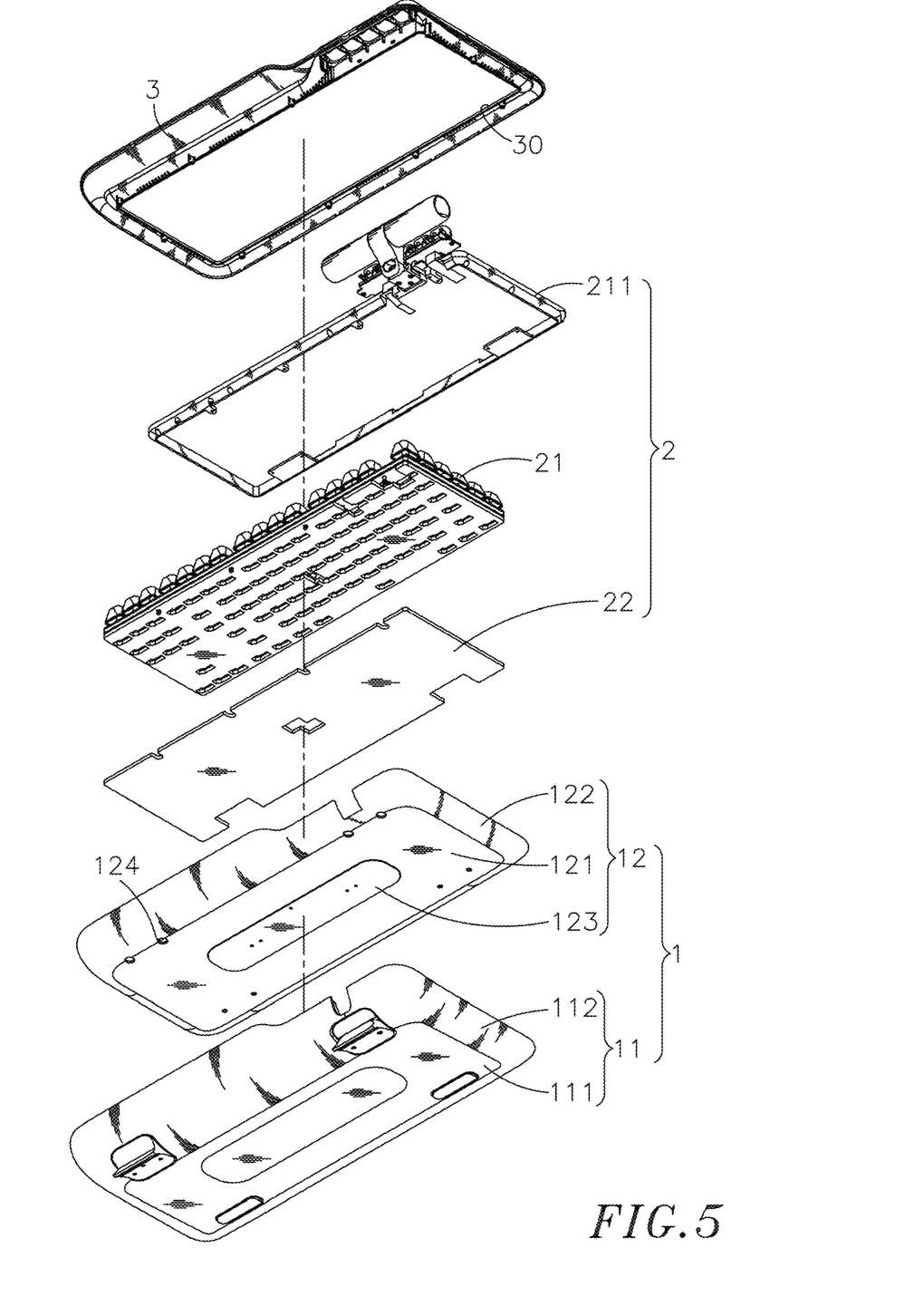
FIG. 5 is a three-dimensional exploded view of the present invention from another perspective.

The light guide shell 3 covers the light guide holder base 1, and the light guide shell 3 is provided with an accommodating opening 30 for exposing the key module 21 of the keyboard assembly 2.

Figure 6:
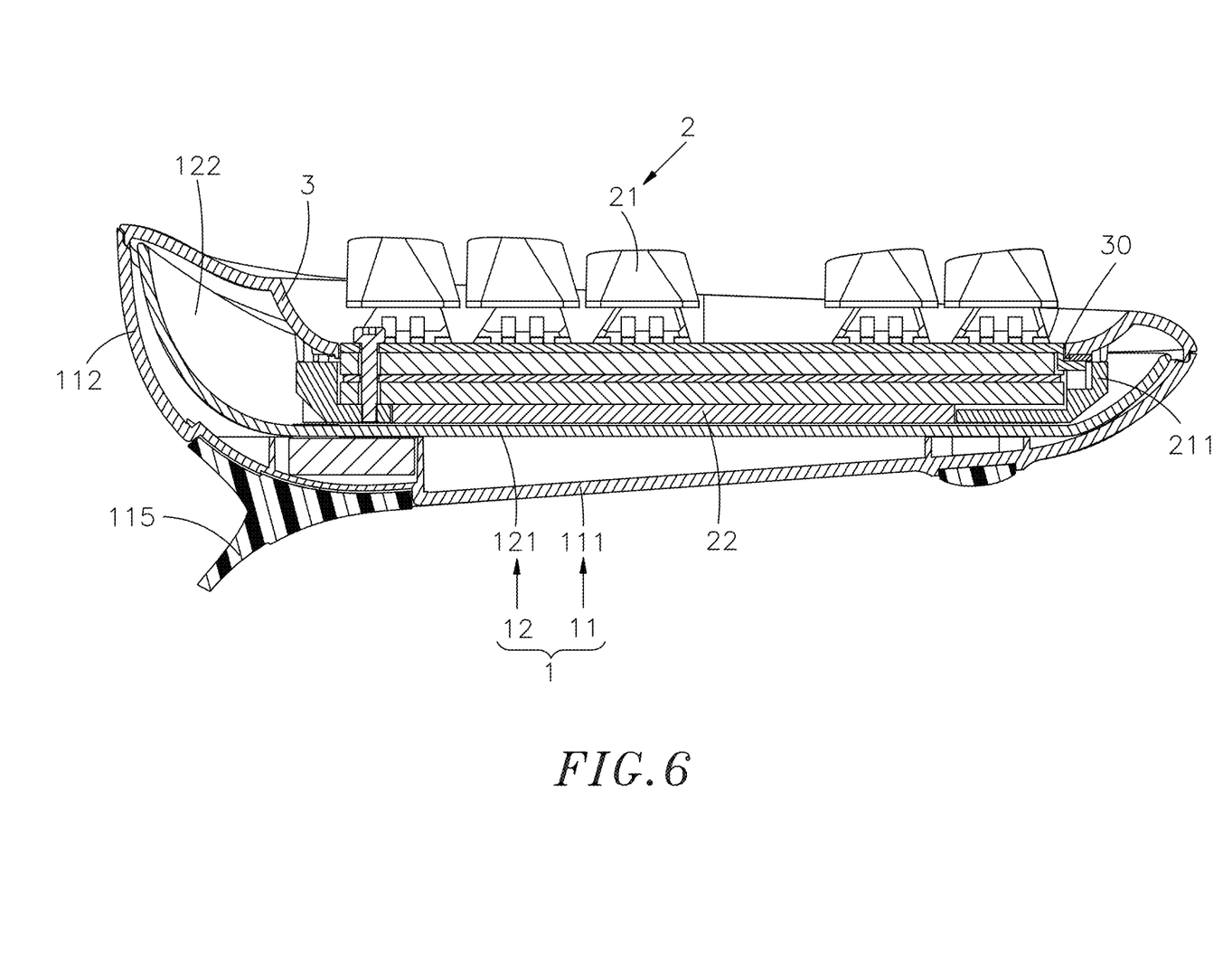
FIG. 6 is a side cross-sectional view of the present invention.

Moreover, the above-mentioned bowl-shaped peripheral wall 112 of the base seat 11 of the light guide holder base 1 and the light guide shell 3 will cover the periphery of the keyboard assembly 2 and expose the key module 21 of the keyboard assembly 2 at the accommodating opening 30, so that a bowl-shaped light-emitting structure is formed for the light guide holder base 1 and the light guide shell 3 covering the keyboard assembly 2.

Moreover, each of the above-mentioned fixing portions 114 has a fixing base 1141. The fixing holes 124 in the light guide seat 12 corresponding to the fixing bases 1141 is provided for a plurality of fasteners (not shown) to be inserted respectively to form positioning, so that the light guide seat 12 is positioned at the fixing bases 1141 and is a distance away from the bottom panel 111 of the base seat 11, forming a suspended visual effect.

Figure 7:
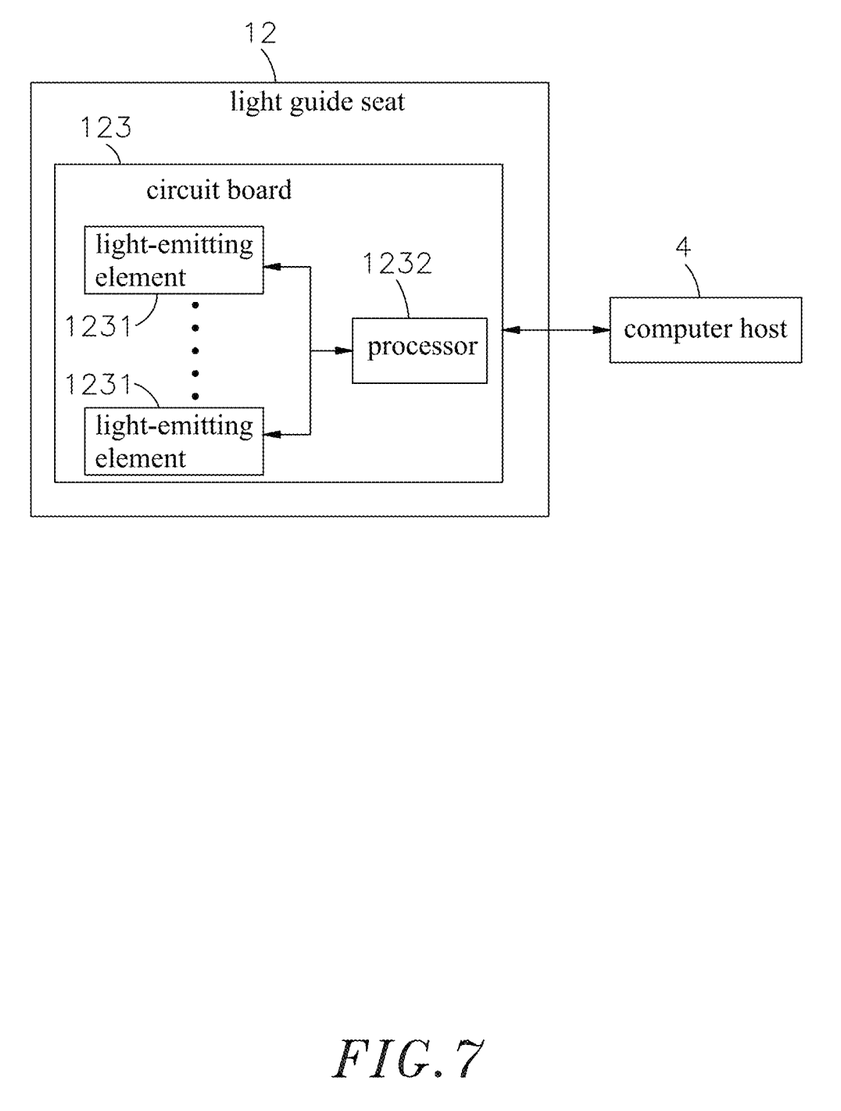
FIG. 7 is a simple block diagram of the present invention.

Furthermore, when the present invention is actually applied, the circuit board 123 of the light guide holder base 1 is first electrically connected to a computer host 4 through a wired or wireless manner, so that the computer host 4 is electrically connected to the processor 1232 through the circuit board 123. The light-emitting elements 1231 surrounding the surface periphery of the circuit board 123 are electrically connected to the circuit board 123, so that the processor 1232 can control the light-emitting elements 1231 to project light to the surrounding inner wall of the light guide plate 121, and the light projected by these light-emitting elements 1231 is projected to the light guide shell 3 through the light guide peripheral wall 122 extending curvedly from the periphery of the light guide plate 121 to form a luminous effect surrounding the keyboard assembly 2. The light guide seat 12 is positioned on the fixing portions 114 protruding in the base seat 11, so that the bottom surface of the light guide seat 12 is a distance away from the bottom panel 111 of the base seat 11, thereby making the base seat 11 made of light-transmitting material form a surface-suspended light-emitting effect when the light guide seat 12 emits light through the light projected by the light-emitting elements 1231.

Furthermore, in the above-mentioned preferred embodiment of the present invention, the computer host 4 transmits signals to the processor 1232 to display at least one or more color changes on each light-emitting element 1231 of the circuit board 123, so that the luminous keyboard can be combined with the suspended luminous visual effect, thereby allowing the vision to be enjoyed in multiple additional modes to produce unexpected effects.

The above is only preferred embodiments of the present invention, and does not limit the patent scope of the present invention. Therefore, all simple modifications and equivalent structural changes made by using the contents of the description and drawings of the present invention shall be included in the patent scope of the present invention and shall be clearly stated.

What the invention claimed is:

1. A luminous keyboard with suspended visual effect, comprising a light guide holder base, a keyboard assembly and a light guide shell, wherein:

said light guide holder base comprises a base seat made of light-transmitting material and a light guide seat, said base seat comprising a bottom panel, a peripheral wall extending curvedly around the periphery of said bottom panel and a positioning portion provided on a top surface of said bottom panel and a plurality of fixing portions protruded from the top surface of said bottom panel, said light guide seat being mounted on said fixing portions and being a distance away from said bottom panel in said base seat, said light guide seat comprising a light guide plate, a light guide peripheral wall extending curvedly around the periphery of said light guide plate corresponding to said peripheral wall of said light guide holder base, a positioning hole located on said light guide plate corresponding to said positioning portion, a circuit board provided in said positioning hole, a plurality of light-emitting elements provided around the periphery of the surface of said circuit board and a processor provided on a surface of said circuit board;

said keyboard assembly is located on a top surface of said light guide seat, said keyboard assembly comprising a key module;

said light guide shell covers said light guide holder base and the periphery of said keyboard assembly, said light guide shell comprising an accommodating opening for exposing said key module of said keyboard assembly; and wherein said light guide seat of said light guide holder base is positioned on said fixing portions of said bottom panel, so that said light guide seat is a distance away from said bottom panel, thereby making said light-emitting elements on said light guide seat in a light-emitting state suspended on said bottom panel.

2. The luminous keyboard with suspended visual effect, as claimed in claim 1, wherein said peripheral wall of said base seat is curved and extended into a bowl shape; said light guide peripheral wall of said light guide seat is curved and extended into a bowl shape.

3. The luminous keyboard with suspended visual effect, as claimed in claim 1, wherein said keyboard assembly further comprises an outer frame arranged around the periphery of said key module.

4. The luminous keyboard with suspended visual effect, as claimed in claim 1, wherein said keyboard assembly further comprises a cushion pad made of silicone material and located on a bottom surface of said key module.

5. The luminous keyboard with suspended visual effect, as claimed in claim 1, wherein each said fixing portion comprises a fixing base; said light guide seat further comprises a plurality of fixing holes corresponding to said fixing bases of said fixing portions for positioning a plurality of fasteners.

\* \* \* \* \*